United States Patent [19]

Chisholm

[11] 4,236,843
[45] Dec. 2, 1980

[54] SIGN POST COUPLINGS

[76] Inventor: Douglas B. Chisholm, 1906 Memory Ct., Vienna, Va. 22180

[21] Appl. No.: 898,892

[22] Filed: Apr. 21, 1978

[51] Int. Cl.² ............................................. F16B 7/00
[52] U.S. Cl. ......................................... 403/2; 285/4; 40/606; 52/98
[58] Field of Search ......................... 403/2; 52/98, 99; 297/386; 188/1 C; 280/746; 285/2, 4; 40/606, 607, 610, 612

[56] References Cited

U.S. PATENT DOCUMENTS

| | | | |
|---|---|---|---|
| 3,106,989 | 10/1963 | Fuchs | 188/1 C |
| 3,521,917 | 7/1970 | King | 403/2 |
| 3,738,390 | 6/1973 | Luckenbill | 285/2 X |
| 3,820,906 | 6/1974 | Katt | 403/2 |
| 3,846,030 | 11/1974 | Katt | 403/2 |
| 3,912,404 | 10/1975 | Katt | 403/2 |
| 3,961,642 | 6/1976 | Thomas | 403/2 X |
| 4,052,826 | 10/1977 | Chisholm | 52/98 |
| 4,071,970 | 2/1978 | Strizki | 403/2 X |

FOREIGN PATENT DOCUMENTS 1390889  4/1975  United Kingdom .................... 188/1 C

*Primary Examiner*—Andrew V. Kundrat
*Attorney, Agent, or Firm*—Cushman, Darby & Cushman

[57] ABSTRACT

Coupling webs are provided for an upright assembly that functions so that there is a high stress concentration for horizontal impact loading while providing zero or low stress concentration for wind or tensile loadings. At least one web is provided with at least one vertical groove in it, and at least one through-extending transverse opening adjacent one end of the groove and providing the end termination of the groove. A portion of the web on one side of the opening is connected to a generally vertical upright member, while the portion of the web on the opposite side of the through-extending opening is connected to a generally vertical base member. A sign preferably is provided on the upright member, and the web may be disposed in a plane generally parallel to the sign.

29 Claims, 17 Drawing Figures

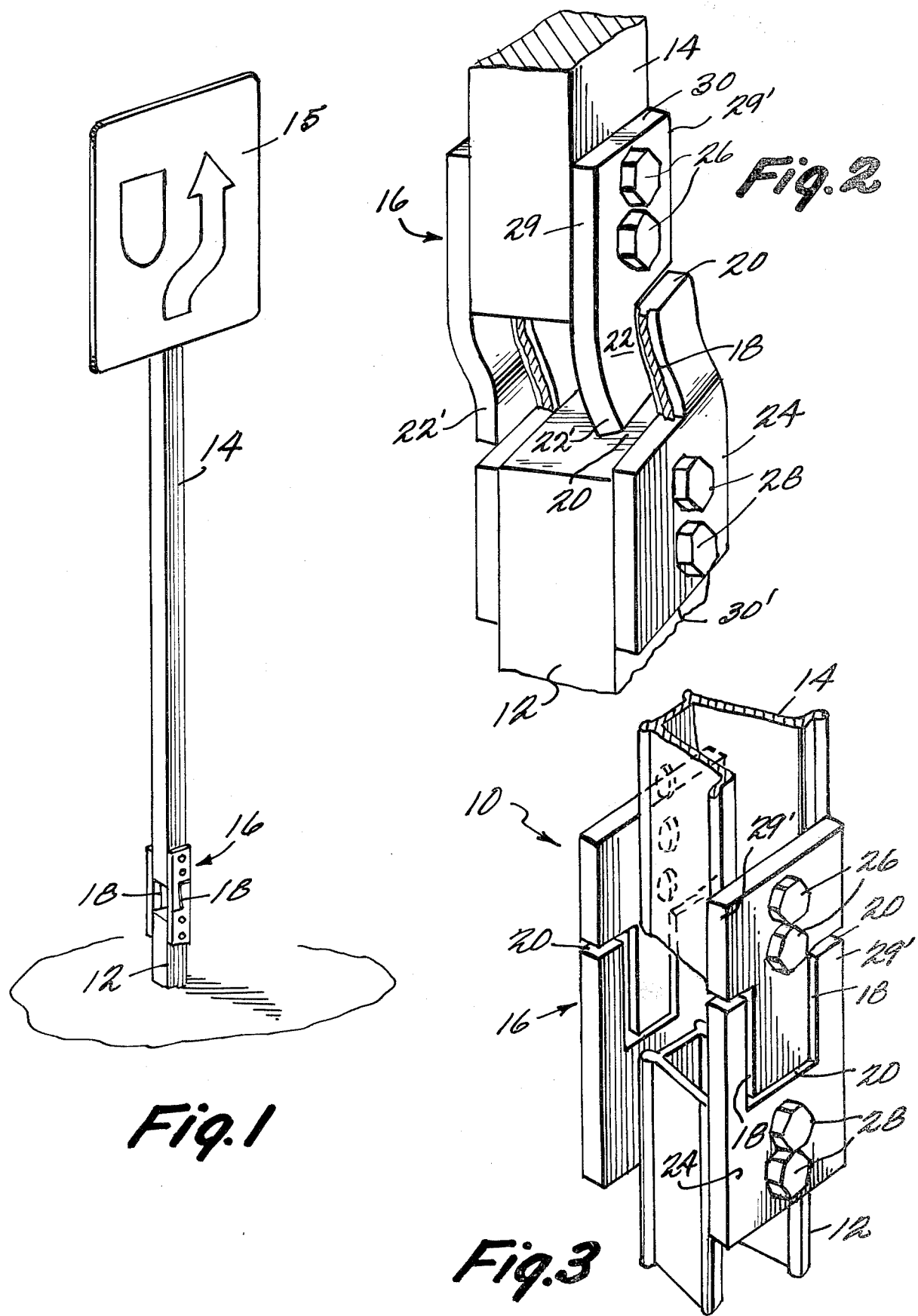

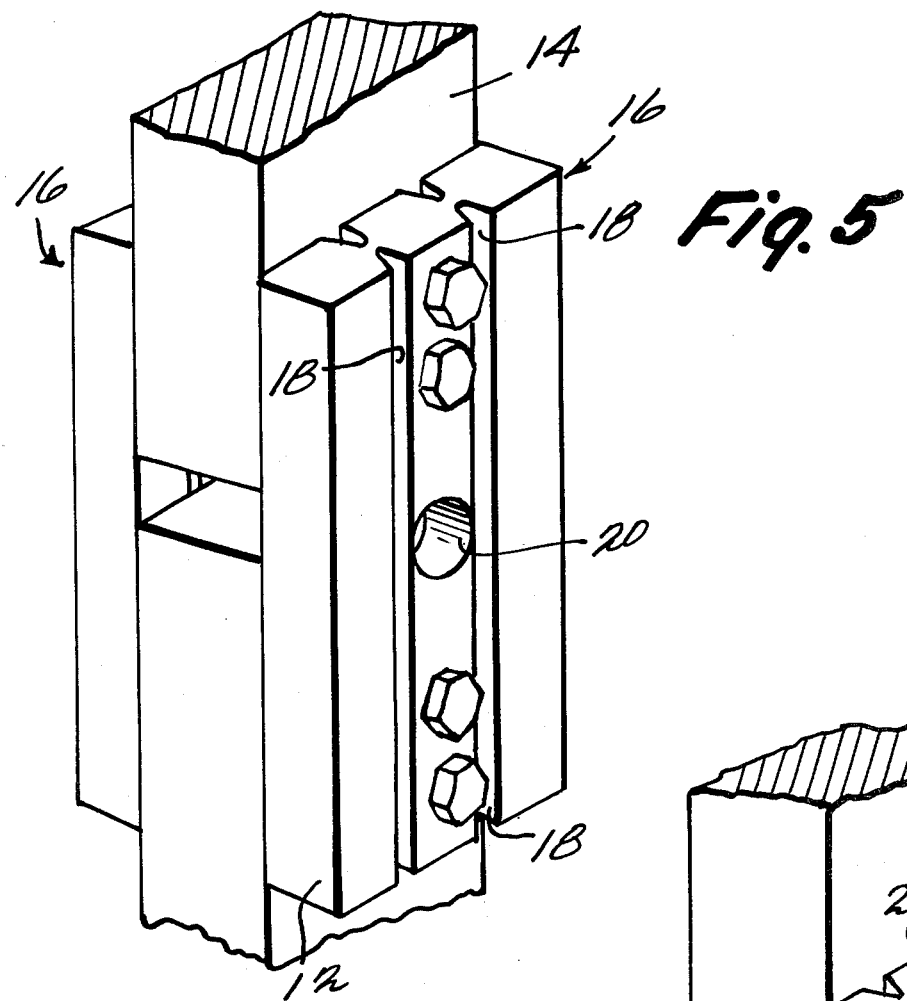
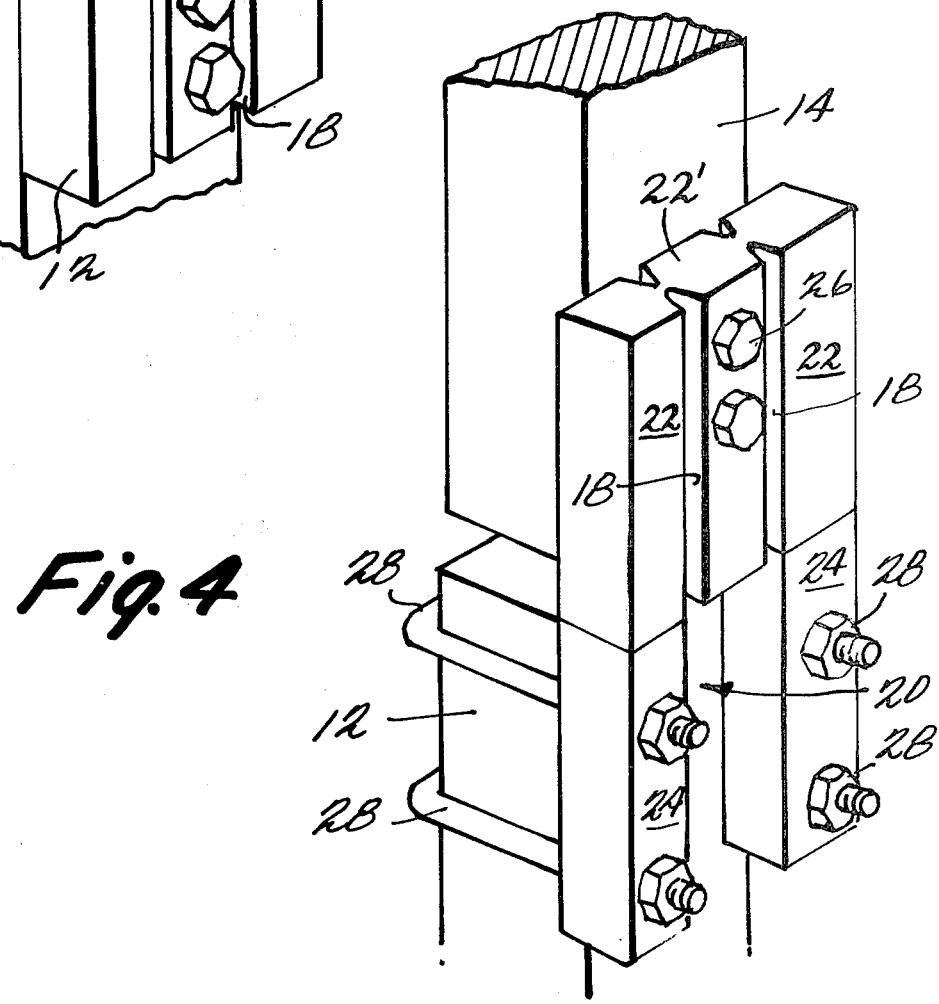

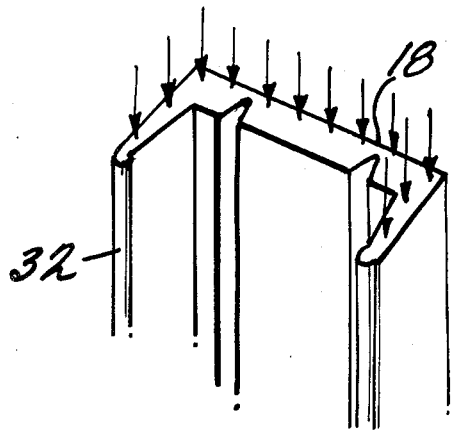
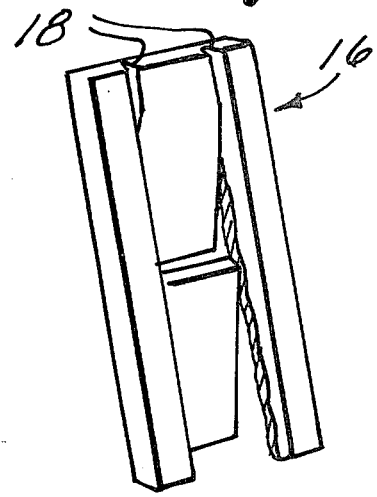
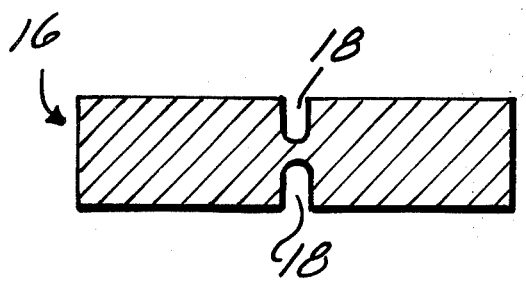
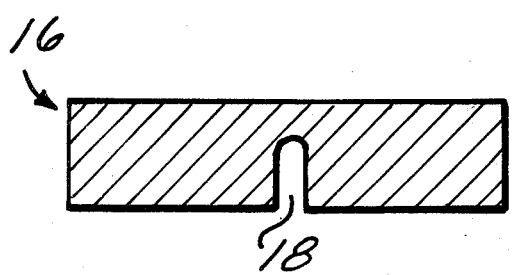
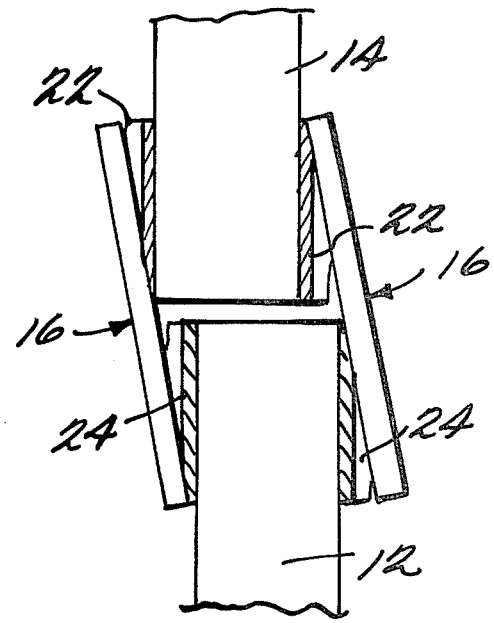

SIGN POST COUPLINGS

BACKGROUND AND SUMMARY OF THE INVENTION

There have been many proposals in the past for frangible couplings for supporting highway sign posts and the like. Such frangile couplings are usually provided with one or more horizontal grooves defining a general plane of weakness, such as shown in U.S. Pat. Nos. 3,820,906 and 4,071,970. In constructing and installing such couplings, a trade-off is provided between the ability of the coupling to "give" when subjected to a horizontal impact and the ability of the coupling to support heavy uprights, signs, and the like, especially when the upright is subjected to wind loading. This trade-off exists because both a horizontal impact loading which desirably causes failure along the horizontal groove, and the tensile and wind loading of the upright act in the same way on the coupling. Thus, the coupling grooves must be made deep enough so that the coupling will fail when subjected to a horizontal impact, yet not so deep that the coupling will not support the weight of the upright, especially under wind loading.

According to the present invention, coupling means are provided that will fail easily when subjected to a horizontal impact, yet is very strong with respect to weight and wind loading. According to the present invention, under impact loading, the coupling means is loaded in bending, for which there is a high stress concentration because of the geometry of the coupling means, and so that under weight or wind loading the coupling means is loaded in shear, where the stress concentration is low or zero.

Segregation of the different types of loading is accomplished according to the present invention by providing coupling webs comprising means defining at least one linear generally vertical groove therein, and means defining a through-extending opening adjacent at least one end of the groove and generally transverse thereto, the opening defining a first portion of the web on one side thereof and a second portion of the web on the other side thereof. Means are provided for attaching the first web portion to a generally vertical upright member, and means are provided for attaching the second web portion to a generally vertical base member. When one or more such webs are used to connect an upright and base together, upon subjection of the upright to a horizontal impact loading the web tears along the groove, high stress concentration being provided. However, when the upright and sign provide weight or wind loadings to the coupling, shearing forces are exerted on the groove, there being no stress concentration for this condition and thus the coupling being able to sustain a load limited only by the metal shear strength along the section at the groove times two, being able to support much higher wind and weight loadings than impact loads. Load ratios of 20:1 or greater are easily achievable with this system.

The coupling means according to the present invention also are fairly insensitive to direction of impact, providing an operational zone of impact of at least about 40 degrees, 20 degrees on either side of the groove, and some embodiments being essentially directionally insensitive. A wide variety of geometrical configurations may be provided as the coupling means according to the invention, some geometries being less direction-sensitive than others, but all such geometries being capable of supporting high weight and wind loadings but yet fracturing easily under horizontal impact loads.

It is the primary object of the present invention to provide improved coupling members for uprights that will break away when subjected to a horizontal impact. This and other objects of the invention will become clear from an inspection of the detailed description of the invention, and from the appended claims.

BRIEF DESCRIPTION OF THE DRAWINGS

FIG. 1 is a perspective view of an exemplary upright assembly according to the present invention;

FIG. 2 is a detail perspective view showing the failure of the coupling means when the assembly is subjected to a horizontal impact load;

FIGS. 3, 4, 5 and 6 are perspective detail views of other upright assemblies according to the present invention;

FIGS. 8a and 8b are perspective and side views, respectively, showing the manner of failure of the assembly of FIG. 5 when subjected to an impact load;

FIG. 9 is a partial detail view of a coupling according to the FIG. 6 embodiment, illustrating the wind or weight loads acting thereon;

FIGS. 17a and 17b are detail sectional views showing configurations that the web grooves may take.

DETAILED DESCRIPTION OF THE DRAWINGS

Figure 6:
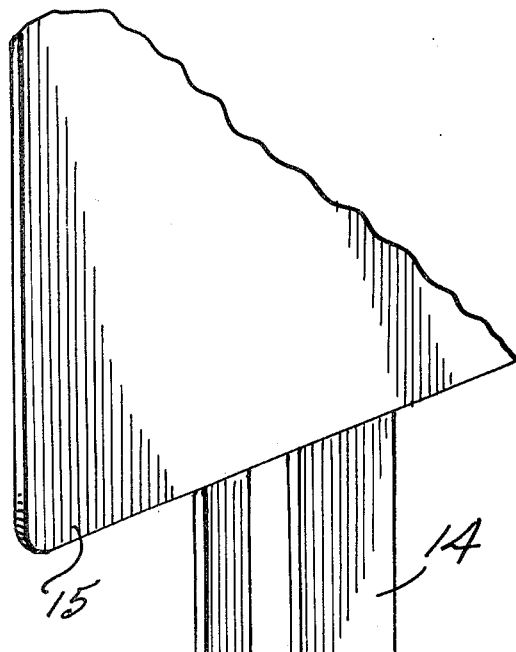
Figure 7:
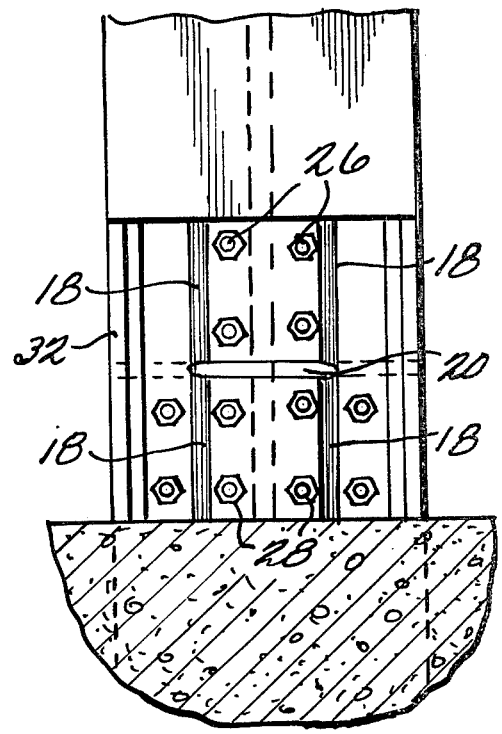
FIG. 7 is a front detail view of the assembly of FIG. 6.

A wide variety of coupling webs according to the present invention are shown in the drawings, the coupling webs for mounting to generally vertical upright and base members to provide upright assemblies. The upright assemblies so provided are readily breakable under normal horizontal loading so that less damage is done to a vehicle impacting the assemblies than otherwise would be the case, and additionally less sign damage is done. The term "web" as used in the specification and claims is used generically to encompass plates, angles, channels and the like, such structures having surfaces that are planar or that have a curvature associated therewith.

All of the upright assemblies illustrated in FIGS. 1, 3, 4, 5, 6, 7, 8b, 11, 14 and 15 have many features in common. Each upright assembly 10 includes a generally vertical base member 12, a generally vertical member 14, and coupling means 16 for connecting the members 12, 14 so that a horizontal impact loading (see FIGS. 2, 8b, 15 and 16) is distinct from wind and weight loadings (see FIG. 9) so that the coupling means will fail in an out-of-plane tearing mode in response to an impact force of magnitude F applied to the upright member 12 in a generally horizontal direction, yet will not fail in any mode as a result of a compression or tensile loading of magnitude F, being able to sustain much higher tensile and compression loadings (up to twenty times higher tensile loads than horizontal loads). Such advantageous force relationships are possible because the coupling means comprises means for loading the couplings so that under impact load the coupling means is loaded in bending, where there is a high stress concentration, and so that under tensile or compression loadings—such as are provided by wind and weight loads—the coupling means is loaded in shear, where there is a low or zero stress concentration.

Each of the embodiments of the coupling means 16 according to the present invention includes at least one web comprising means defining at least one linear generally vertical groove 18 therein, means defining a through-extending opening 20 adjacent at least one end of said groove and generally transverse thereto, said opening 20 defining a first portion 22 of the web on one side thereof and a second portion 24 of the web on the other side thereof, means 26 for attaching the first web portion 22 to one of the members 12, 14, and means 28 for attaching the second web portion to the other of said members. The portions 22, 24 of the web on either side of the opening 20 will separate under impact loading (in response to an impact force in a generally horizontal direction). The attaching means 26, 28 normally will take the form of openings provided in the web that cooperate with bolts, pins, rivets, or like fastening members passing through the members 12, 14. On all embodiments except the FIG. 14 embodiment, two webs preferably are provided mounted on opposite sides of the members 12, 14 (see FIGS. 2, 3, 5, 6, 8b and 11 in particular) to insure that wind loads will only result in the loading of the grooves in tensile and compression (shear loading), and where a sign 15 (see FIGS. 1 and 6) is disposed on the upright member 15 above the coupling means 16, the web 17 surfaces containing the grooves 18 are disposed in planes generally parallel to the sign 15.

In some embodiments of the invention (FIGS. 1–5), the webs forming the coupling means 16 are quadrate plates having two web faces, two side edges 29, 29', and top and bottom edges 30, 30', respectively. Although the plates may be constructed of any suitable material, it is preferred that they be formed as aluminum castings or as aluminum extrusions.

The groove 18 in the plates may be provided in both or just one face of the plates, as illustrated in FIGS. 17a and 17b, respectively, two grooves formed in the opposite plate faces being disposed in a common plane transverse to the plate faces. Generally, the grooves 18 will be formed so that 10 to 40 percent of the thickness of the plates remains at the area of the groove, and the grooves are generally "V" or "U" shaped.

In the embodiment of FIGS. 1 and 2, each of the plates forming the coupling means 16 includes one groove 18, and two transverse openings 20 opening from opposite ends of the groove 18 toward the plate side edges 29, 29', respectively. The two plates on opposite sides of the members 12, 14 are mounted so that the grooves 18 in the two plates are coplanar, and so that the tongue portions 22' of the first portions 22 are disposed on the same side of the grooves 18, and the tongue portions 24' of the plate's second portions 24 are disposed on the same side of the grooves 18, as shown in FIG. 2.

In the FIG. 3 embodiment, each plate of the coupling means 16 includes two grooves 18 and three transverse openings 20, one transverse opening 20 extending from one end of each of the grooves to the plate side edges 29, 29', respectively, and the other transverse opening extending between the other ends of the grooves 18, and providing an end termination thereof. The embodiment of FIG. 2 is less direction-sensitive than the embodiment of FIG. 3, although both embodiments have an operational zone of failure of $\theta$ where $\theta$ is equal to about 40 degrees (20 degrees on either side of a horizontal impact load transverse to the plates).

The embodiments of FIGS. 4 and 5 are similar except that in the FIG. 5 embodiment there are four grooves 18 (in each face) having one transverse opening 20 commonly terminating ends thereof, while in the FIG. 4 embodiment, only two grooves 18 are provided with the common transverse opening 20, no other metal being provided between extensions of the grooves 18 in the lower portion 24 of the web. The FIG. 4 embodiment is advantageous in that it utilizes less metal; however, the FIG. 5 embodiment is advantageous in that either side thereof may be attached to either member 12, 14, whereas in the FIG. 4 embodiment, care must be taken to see that the portion 22' is disposed coincident with the upright member 14 (unless the upright 14 is thinner than the distance between the two grooves 18, which is not desirable). U-bolts may be provided as part of the mounting means 28 if desired in the FIG. 4 embodiment.

In the embodiment shown in FIGS. 6, 7, 9, 12 and 13, the web forming coupling means 16 is most readily formed as an aluminum extrusion, having upturned side portions 32 generally perpendicular to face 34 containing the attaching means 26, 28, so that it has more or less a C cross section. In these embodiments, preferably four grooves 18 are provided with a single transverse opening 20. Two webs 16 are normally provided mounting an upright 14, and the upturned side portions 32 of the two webs face in opposite directions, although they are coplanar with the corresponding upturned portions 32 of the opposite web.

The channel shape of the webs of FIGS. 6, 7, 9, 12 and 13 is advantageous in that such webs have larger shear strength and are capable of supporting greater weight loadings than are flat plates. In the FIGS. 6, 7 and 9 embodiment, the grooves 18 are formed in the central face containing the attaching means 26, 28 and opening 20, while in the FIGS. 12 and 16 embodiment, the grooves are formed in the side portions 32 at the line of intersection with the central face 34 (the start 18 of each groove 18 essentially being in the plane of face 34). In either the FIGS. 6 or 12 embodiments, the groove 18 axes must be orientated so that the face containing them is perpendicular to the direction of impact—for the FIG. 6 embodiment so that central face 34 is perpendicular, and for the FIG. 12 (see FIG. 16 too) embodiment the faces 32 are perpendicular.

Figure 10:
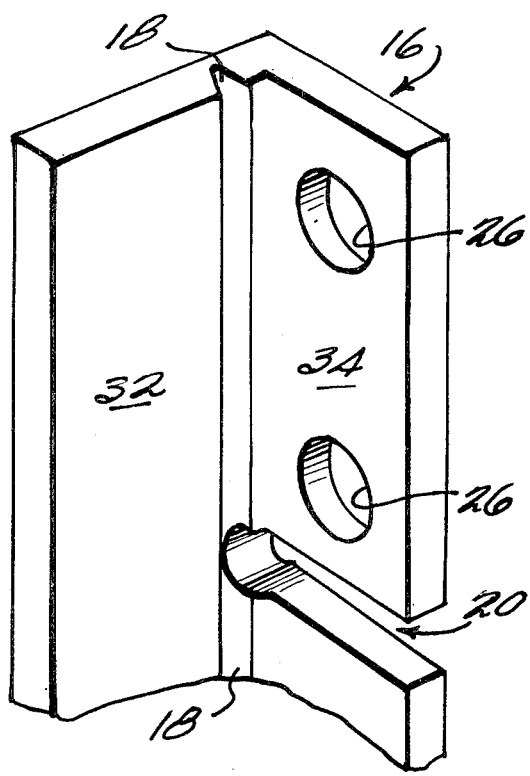
FIG. 10 is a partial detail view of another embodiment of the coupling means according to the invention having groove axes formed on a web portion perpendicular to the portion having attaching means associated therewith.
Figure 11:
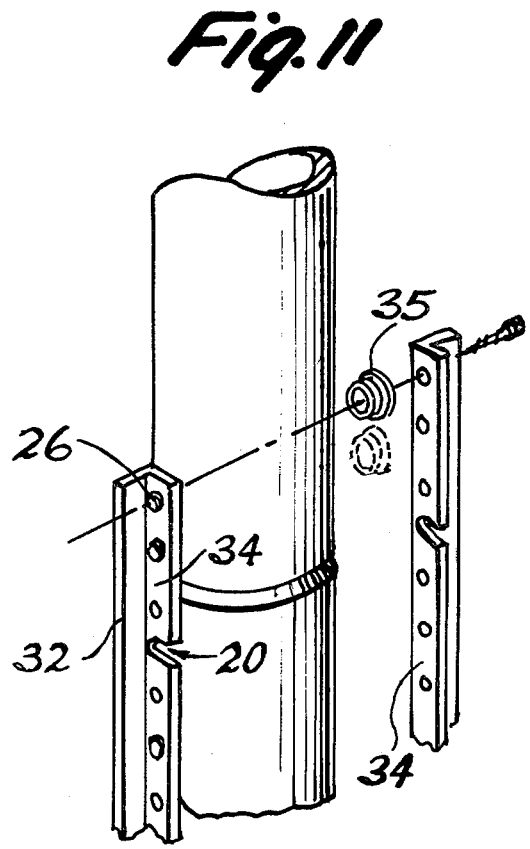
FIG. 11 is a perspective view of an exemplary upright assembly utilizing the coupling of the FIG. 10 embodiment.
Figure 12:
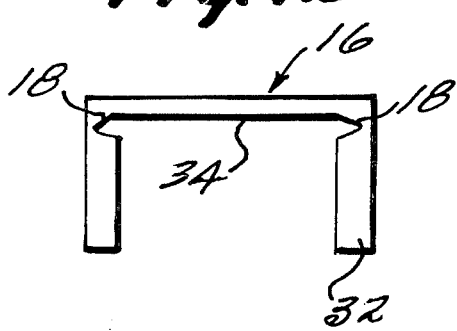
FIG. 12 is a top view of modification of the coupling of FIG. 10.

In the FIG. 10 embodiment, a coupling is illustrated having a single side portion 32 generally perpendicular to face 34 which contains the attaching means 26, 28. In this embodiment, the groove 18 is formed in the portion 32. FIG. 11 illustrates an exemplary upright assembly utilizing the coupling 16 of FIG. 10, the groove 18 axis being parallel to the line of impact and the assembly. Cup washers 35 may be used to relieve bearing loads on the pole adjacent to the fastening bolts.

Figure 13:
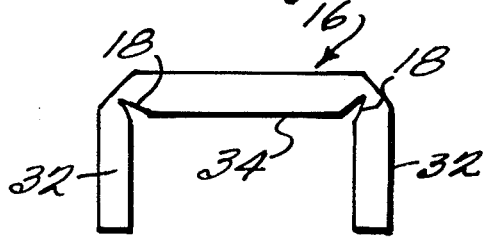
FIG. 13 is a top view of another modification of the coupling according to the invention showing the groove axes at 45 degrees with respect to a perpendicular to a face of the web.
Figure 14:
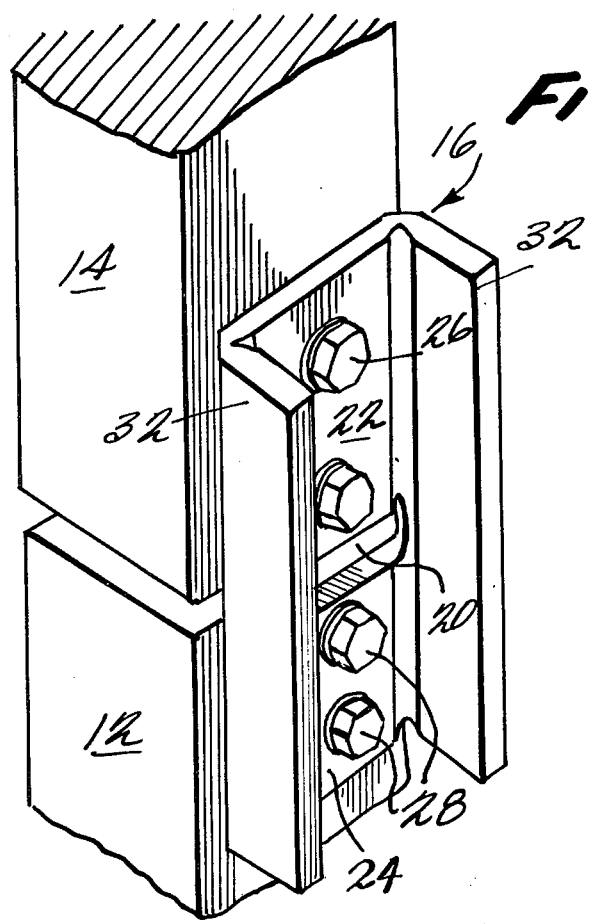
FIG. 14 is a perspective view of an upright assembly utilizing the coupling of FIG. 13.
Figure 15:
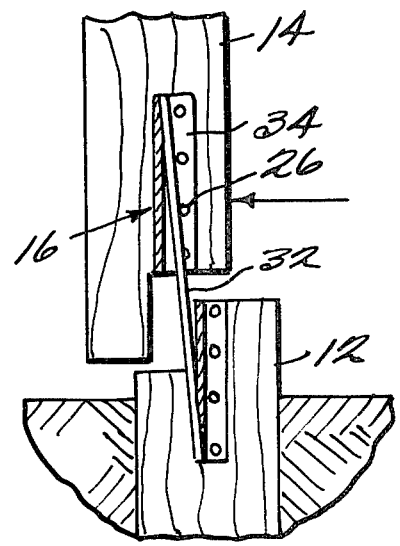
FIGS. 15 and 16 are side and perspective views, respectively, showing the manner of failure of the couplings of FIGS. 10 and 12, respectively, when subjected to an impact load.
Figure 16:
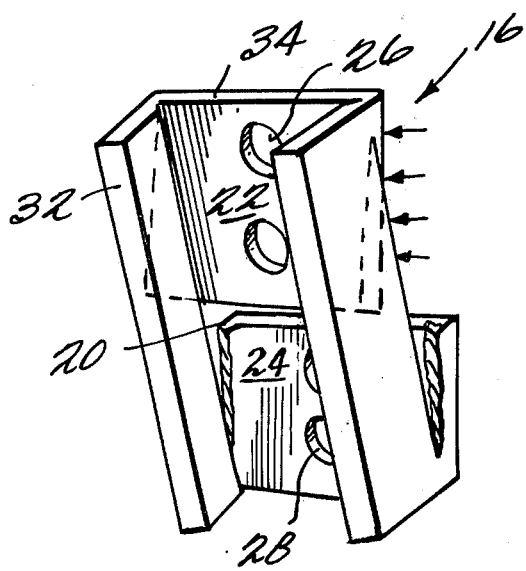

The FIGS. 13 and 14 embodiment provides the grooves 18 in the area of intersection between the faces 32, 34, the groove axes being such that they make an angle of about 45 degrees with respect to a perpendicular N to either of the faces 32, 34. This embodiment is advantageous in that it is almost completely direction insensitive, yet omnidirectional bending stiffness is provided, and also since in some circumstances only one channel 16 need be used in the assembly (see FIG. 14). Of course, more than one channel may be used if desired, and when the upright and base members 12, 14 comprise poles, the faces 32 may be disposed so that they encircle the pole.

FIGS. 2, 8a, 8b, 15 and 16 show the mode of fracture of the couplings 16 according to the present invention under an impact load. Each of the webs will start to tear along one or more grooves 18 starting first adjacent an opening 20, and continuing until another opening 20 or the end of the web. FIG. 9 shows the tensile and compressive forces that act on a coupling 16 as a result of wind and weight loadings so that a clear comparison can be made between the bending (tearing) mode of the couplings as a result of horizontal impact, and the shear mode of the couplings due to tensile and compressive loadings.

In plates wherein only one transverse opening 20 is provided, normally the other end of the groove(s) will continue all the way to the end of the coupling (i.e., see FIG. 6), although if desired the groove could be terminated just short of the plate end as long as such termination did not prevent complete tearing. Additionally, fracture initiating means may be provided at the portion of the groove directly at a transverse opening 20 (i.e., the groove may be deeper directly adjacent the opening 20 than along the rest of its length). Where the members 12, 14 are made of wood or like material, shear (cup) washers may be provided around the bolts attaching the couplings to the members 12, 14, to relieve the bearing loads on the wood adjacent the bolts.

The assembly according to the present invention is useful with any type of upright of virtually any shape, including standard U-post signs, wooden signs, utility poles, and other vertical poles, whether made of wood, metal, or concrete.

It will thus be seen that according to the present invention an improved upright assembly, and coupling web therefor, have been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. An upright assembly comprising
   (a) a generally vertical upright member,
   (b) a generally vertical base member,
   (c) at least one web comprising (i) means defining at least one linear generally vertical groove therein,
   (ii) means defining a through-extending opening adjacent at least one end of said groove and generally transverse thereto, said opening defining a first portion of said web on one side thereof, and a second portion of said web on the other side thereof, so that the portions of the web on either side of said opening will separate under impact loading,
   (d) means for attaching said first web portion to one of said members, and
   (e) means for attaching said second web portion to the other of said members.

2. An upright assembly as recited in claim 1 wherein said upright member has a sign disposed thereon vertically above said web, and wherein said web is a plate disposed in a plane generally parallel to said sign.

3. An upright assembly as recited in claim 2 wherein two plates are provided attached to opposite sides of said members, each of said plates disposed in a plane generally parallel to the plane of said sign.

4. An upright assembly as recited in claim 1 wherein said web is a channel member having a face containing said at least one opening, and a pair of side portions generally perpendicular to said face.

5. An upright assembly as recited in claim 4 wherein said web includes means defining two generally vertical spaced-apart grooves therein, and wherein said transverse opening is formed in a middle portion of said plate and is transverse to both said grooves.

6. An upright assembly as recited in claim 5 wherein said grooves are formed in said channel member central face.

7. An upright assembly as recited in claim 5 wherein said grooves are formed in said channel member side portions at the line of intersection of said side portions with said central face.

8. An upright assembly as recited in claim 5 wherein said grooves are formed in the area of intersection between said channel member central face and said portions such that they make an angle of about 45 degrees with respect to a perpendicular to said face.

9. An upright assembly as recited in claim 1 wherein said web is an angle member, having a central face containing said at least one opening, and a side portion generally perpendicular to said face.

10. An upright assembly as recited in claim 9 wherein said groove is formed in said side portion of said angle member at the line of intersection of said side portion with said face.

11. An upright assembly as recited in claim 1 wherein two webs are provided mounted on opposite sides of said members.

12. An upright assembly as recited in claim 11 wherein each of said webs comprises means defining two transverse openings, one being defined at either end of said groove and oppositely directed so that said first web portion comprises a tongue portion on one side of said groove and said second web portion comprises a tongue portion on the opposite side of said groove, and
   wherein the grooves in said two webs are coplanar and wherein said tongue portions of said webs first portions are disposed on the same side of said grooves, and said tongue portions of said webs second portions are disposed on the same side of said grooves.

13. An upright assembly as recited in claim 11 wherein each of said webs comprises means defining first and second generally vertical grooves, and means defining first, second and third transverse openings, and wherein each of said webs has first and second side edges thereof extending generally vertically, and wherein said first transverse opening extends from one end of said first groove to said first web side edge and said second of said transverse openings extends from one end of said second of said grooves to said second plate side edge, and wherein said third transverse opening extends between the opposite ends of said first and second grooves.

14. An upright assembly as recited in claim 11 wherein said means for connecting said web portions to said members are common to both of said webs.

15. An upright assembly as recited in claim 11 wherein each of said webs has a central face containing said opening and generally perpendicular side portions, said side portions of each of said webs facing oppositely of said corresponding side portions of the other of said webs.

16. An upright assembly as recited in claim 15 wherein each of said plate portions comprises means defining two generally vertical grooves, and wherein each of said plate portions comprises means defining one transverse opening between ends of said grooves.

17. An upright assembly as recited in claim 1 wherein said at least one longitudinal groove is generally V-shaped and is formed in a first vertical face of said web.

18. An upright assembly as recited in claim 17 wherein said at least one longitudinal groove comprises a second groove substantially identical to said one groove and formed in the face of said web opposite said first vertical face so that a thin section is provided generally equidistant between said web faces.

19. An upright assembly comprising
a generally vertical upright member,
a generally vertical base member, and
coupling means for connecting said upright and base member together so that a horizontal impact loading is distinct from wind and weight loading, so that said coupling means will fail in an out-of-plane tearing mode in response to an impact force of magnitude F applied to said upright member in a generally horizontal direction yet will not fail in any mode as a result of a compression or tensile loading F.

20. An upright assembly as recited in claim 19 wherein said coupling means comprises a pair of webs disposed on opposite sides of said upright and base members and wherein each of said webs comprises: means defining at least one linear generally vertical groove therein, a face containing said groove being transverse to an expected horizontal impact loading; and means defining a through-extending opening adjacent at least one end of said groove and generally transverse thereto, said opening defining a first portion of said web on one side thereof, and a second portion of said web on the other side thereof, so that the portions of the web on either side of said opening will separate under impact loading; and wherein said upright assembly further comprises
means for attaching said first web portion of each web to one of said members, and
means for attaching said second web portions of each web to the other said members.

21. An upright assembly as recited in claim 19 wherein said coupling means comprises means for loading said coupling so that under impact load said coupling means is loaded in bending, having a high stress concentration, and so that under tensile or compression loading said coupling means is loaded in shear, having a low or zero stress concentration.

22. A channel member comprising a central face and two opposite side portions extending generally perpendicular to said central face,
means defining at least one linear groove in at least one of said central face and said side portions, said groove having an axis generally parallel to said side portions,
means defining a transverse through-extending opening in said central face adjacent at least one end of said groove and providing substantially an end termination thereof, and
means for receipt of a fastening component formed in said central face on each side of a plane passing through said opening perpendicular to said central face.

23. A channel member as recited in claim 22 wherein said at least one linear groove is formed in said central face.

24. A channel member as recited in claim 22 wherein at least two linear grooves are provided, and wherein said grooves are formed in said side portions at the line of intersection with said central face.

25. A channel member as recited in claim 22 wherein at least two linear grooves are provided, and wherein said grooves are formed in the area of intersection between said central face and side portions such that they make an angle of about 45 degrees with respect to a perpendicular to said central face.

26. A channel member as recited in claim 22 formed as an aluminum extrusion.

27. An angle comprising a central portion of a predetermined thickness and providing a central face and a side portion of a predetermined thickness and providing a side face generally perpendicular to said central face,
means defining at least one linear groove in at least one of said central face and said side face, said groove having an axis generally parallel to said side portion,
means defining a transverse through-extending opening in said central face adjacent at least one end of said groove and providing substantially an end termination of said groove, and
means for receipt of a fastening component formed in said central face on each side of a plane passing through said opening perpendicular to said central face.

28. An angle as recited in claim 27 wherein said groove is formed in said side face at the line of intersection of said side face and said central face.

29. A quadrate plate formed as an aluminum casting and comprising: two faces, two side edges, and top and bottom edges; means defining two spaced linear grooves in one of said faces, said grooves generally parallel to said plate side edges; means defining three transverse-extending openings two of said openings being colinear and terminating corresponding ends of each of said grooves, and the third of said openings providing an end termination of both of said grooves; and means for receipt of a fastening component formed in said plate on each side of a plane passing through said third opening perpendicular to said top and bottom faces.

* * * * *